Oct. 2, 1928.
F. W. HORSTKOTTE
1,686,088
UNLOADING MACHINE
Filed Oct. 12, 1927 4 Sheets-Sheet 3
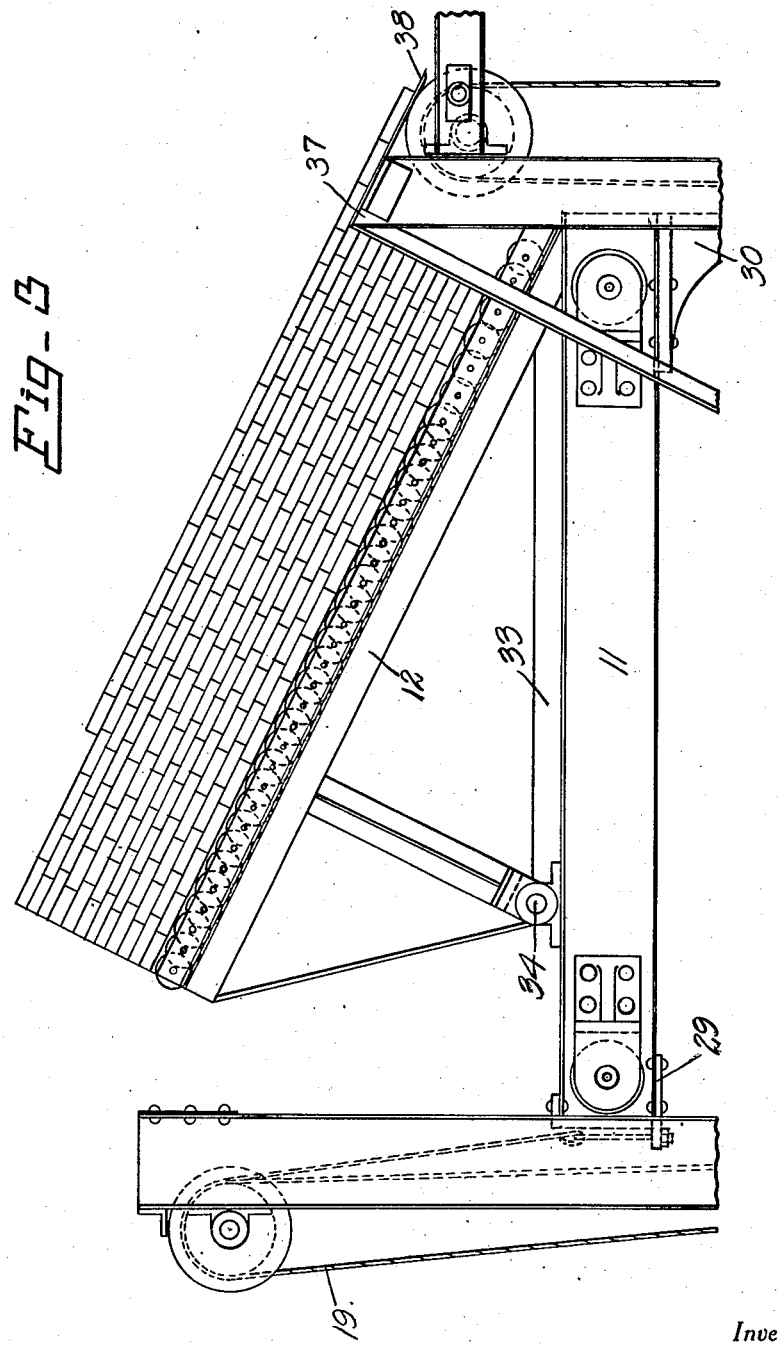
Inventor
Frederick W. Hortscotte
By Herbert E. Smith
Attorney

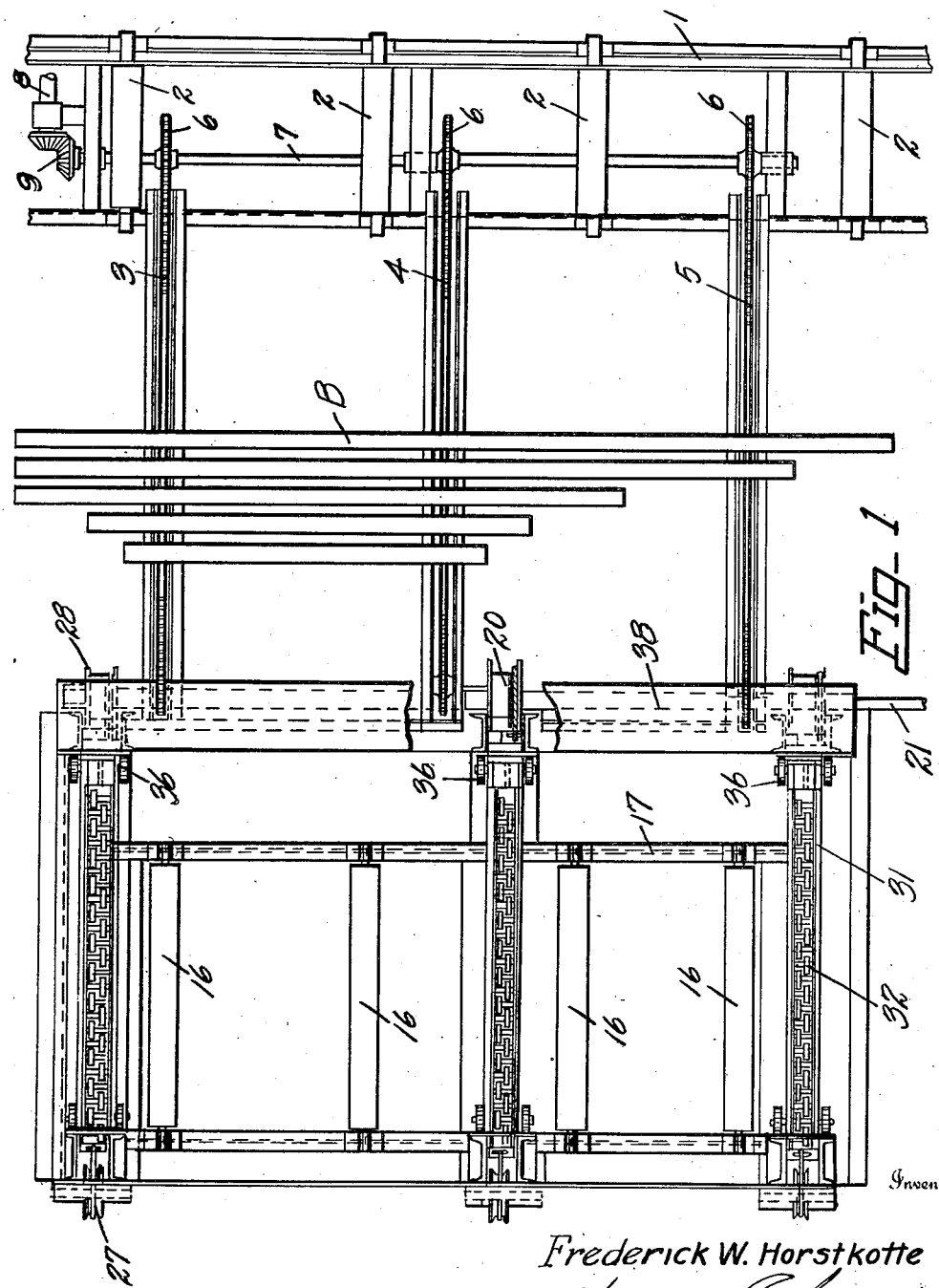

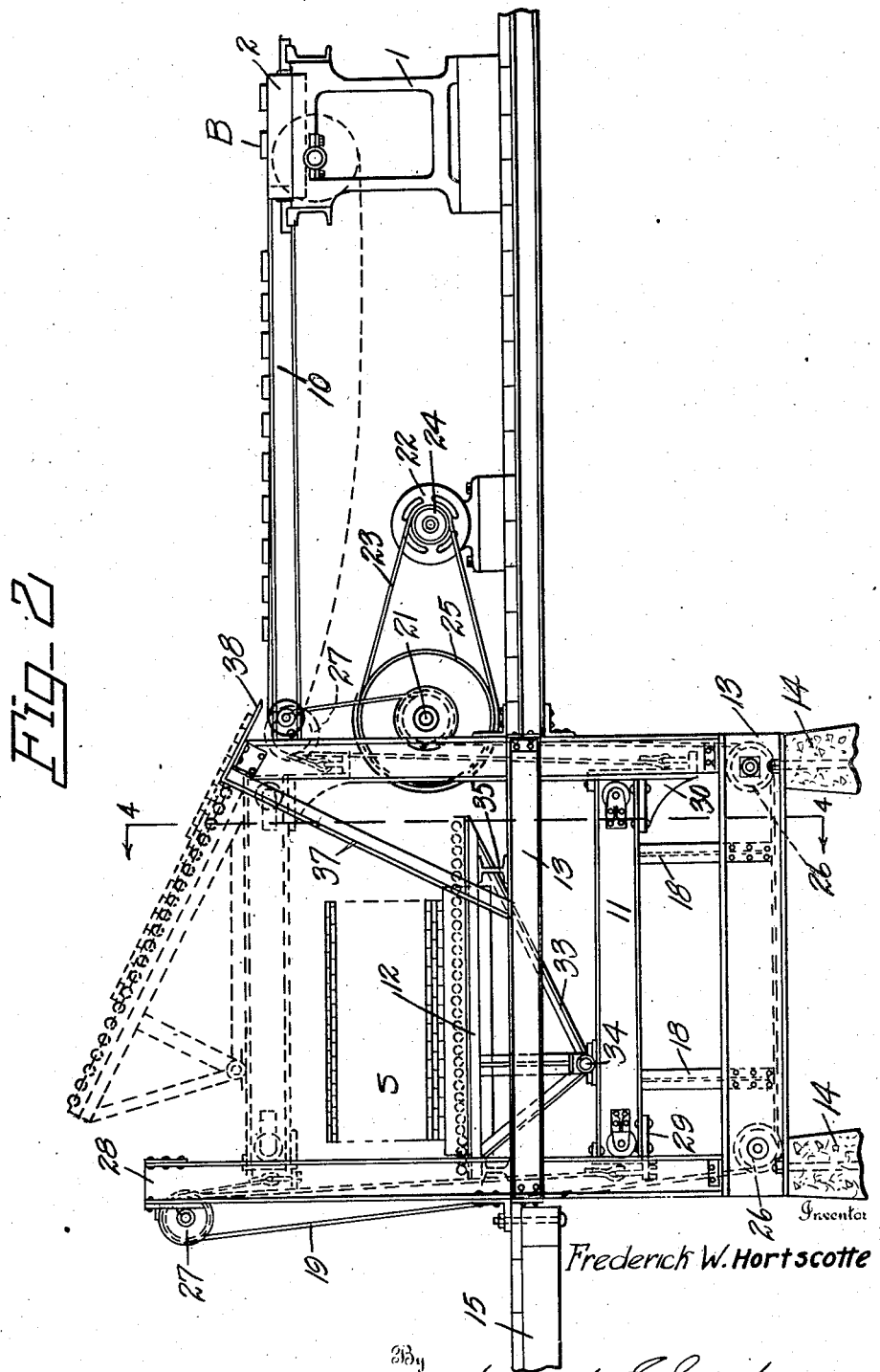

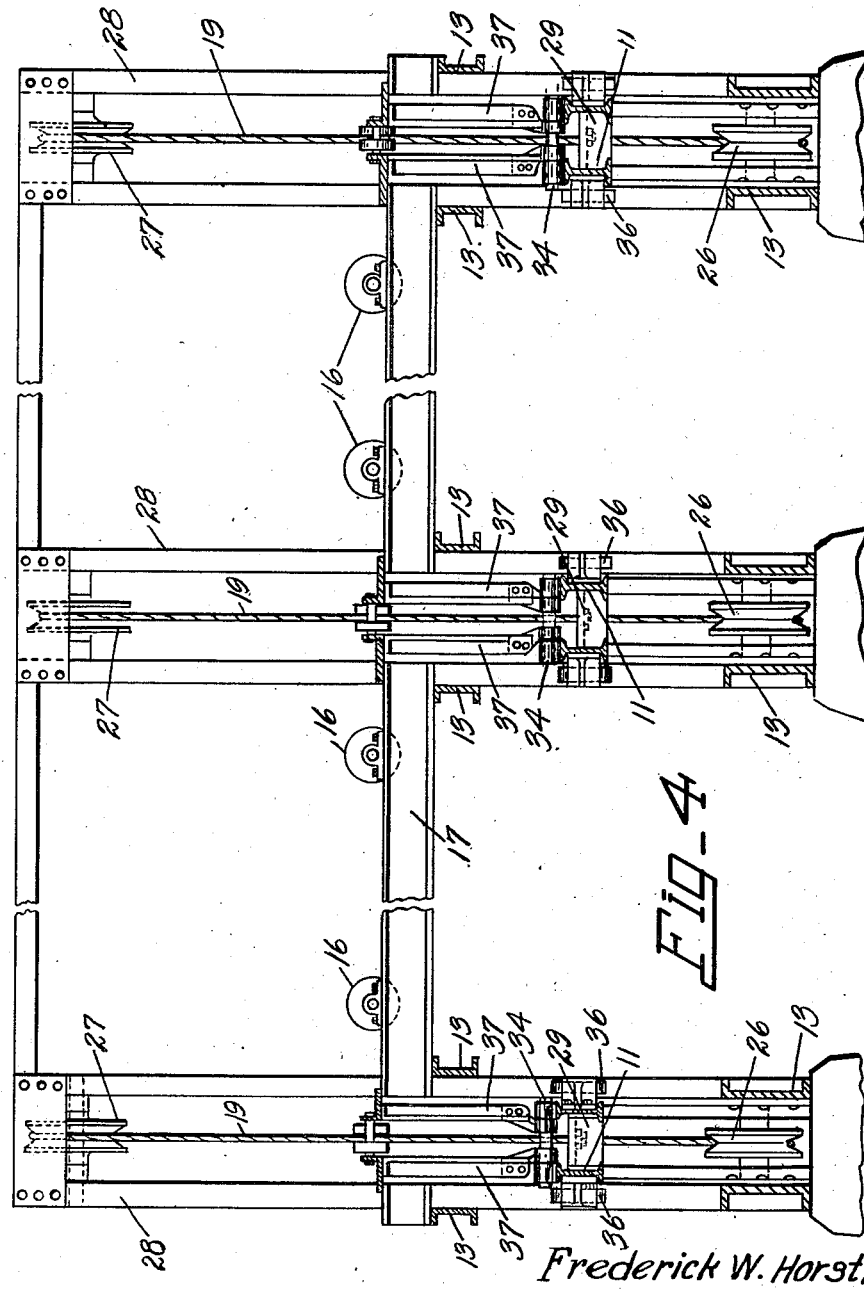

Patented Oct. 2, 1928.

1,686,088

UNITED STATES PATENT OFFICE.

FREDERICK W. HORSTKOTTE, OF PORTLAND, OREGON.

UNLOADING MACHINE.

Application filed October 12, 1927. Serial No. 225,740.

My present invention relates to an improved unloading machine for stacks or piles of lumber, which, while adapted for various uses in connection with different materials, is specially designed for unloading boards or lumber, in stacks or piles, preparatory to being fed to a planing mill. In carrying out my invention I utilize an elevator or hoist upon which the stack or pile of lumber is supported by means of a tiltable chute from which the material is laterally discharged and then conveyed, as by endless chain conveyers to a roll-conveyer and the latter conveyer feeds the material while in horizontal position in a longitudinal direction to the planing mill.

In the present practice of feeding lumber to the planing mill the lumber is conveyed to the mill in wagons, lumber buggies, carriers, yard cars, cranes, and other means and deposited alongside the feed table (employing a roll conveyer) upon which the lumber is placed, a board at a time. Where a crane is employed the lumber, in loads, is moved successively, and stored on a set of live or dead rolls which lead to the feed table, and when one load is finished another load is moved to place. When buggies or yard cars are used, after the load has been removed, the empty vehicle must be replaced with a loaded one. These various means of conveying the material to the feed table result in much loss of time and intermittent operations. By the utilization of the machine of my invention, the material may be continuously fed or conveyed to the conveyer table of the planing mill, and the movement of the material regulated in order that time and labor may be saved and the efficiency of the machine enhanced.

My invention consists in certain novel combinations and arrangements of parts as will hereinafter be more fully described and claimed. In the accompanying drawings I have illustrated one complete example of the physical embodiment of my invention wherein the parts are combined and arranged according to the best mode I have thus far devised for the practical application of the principles of my invention.

Figure 1 is a top plan view of the machine of my invention showing it in operative relation to the feed table or roll-conveyer, and illustrating various lengths of boards or lumber that may be handled by the machine.

Figure 2 is a view in side elevation of the machine showing by dotted lines the tiltable platform in tilted position to feed the layers of boards to the chain conveyers and thence to the feed table or roll-conveyers.

Figure 3 is an end view showing the elevator separated from the machine and illustrating how the stack or pile is reformed by the tilting of the platform for the purpose of depositing the successive layers of boards on the chain conveyers.

Figure 4 is a sectional view at line 4—4 of Figure 2 showing the elevator, its tiltable chute, the guide posts for the elevator, the pivot or hinge of the tiltable chute and other related parts.

In order that the general arrangement and relation of parts may readily be understood I have illustrated a well known type of feed table 1 having transversely disposed rolls 2 over which the boards B are moved longitudinally to the planing machine.

In Figure 1 a number of lengths of boards or timbers B are shown illustrating how various sizes of material may be fed over the endless chains 3, 4, and 5 that are driven from sprocket wheels 6 on the operating shaft 7, and the latter is operated from a drive shaft 8 through a bevel-gear couple 9. These conveyer chains are supported in a suitable frame 10 at one side of the feed table 1 and between said table and the mechanism of my invention that includes an elevator 11 and a tiltable platform 12 carried thereon.

The elevator is vertically reciprocable in the main hoist-frame 13, supported in piers 14, below the floor line 15, and the boards in stacks or piles S are brought to the main frame over rolls 16 forming a roll-conveyer on the frame 17. As seen in Figure 1 the rolls 16 and the feed rolls 2 form parts of parallel conveyers, the rolls 16 being the conveyer for the stacks or loads S and the rolls 2 being used to feed the single boards to the planing machine.

The elevator 11 comprises a rectangular frame that normally rests upon the upright posts 18 forming part of the frame 13, and it is elevated by means of cables 19 and drums 20 on the shaft 21 that is operated from the motor 22 through belt 23 and pulleys 24 and 25 in Figure 2.

The cables pass around guide pulleys 26 located at suitable points for the purpose and over the upper pulleys 27 that are journaled in bearings on the guide posts 28 forming part of the main frame 13.

The guide posts 28 are made up of vertically arranged, spaced, channel plates and the transverse beams of the elevator frame are provided with guide brackets 29 and 30 at their respective ends. The cables are attached to these guide brackets, and the brackets move vertically between the spaced channel beams or uprights of the posts to guide the elevator and retain it against displacement.

The frame of the elevator and the guideposts for its brackets are so arranged as not to interfere with the movement of a stack or pile of lumber as it is conveyed over the rollers 16 to position above the elevator and its tiltable chute 12 where the load may be transferred from the conveyer to the chute of the elevator.

The tiltable chute 12 includes three or more spaced beams 31 in the upper faces of which are journaled numerous rollers 32, the beams extending along the line of axis of the rollers 16 and the axes of the rollers being journaled transversely of the chute-beams, 31. The chute beams are provided with strut frames 33 beneath them and each strut-frame is hinged or pivoted at 34 on the top face of the elevator frame, the pivot being located at one side of the longitudinal center of the tiltable platform or chutes in order that the chutes may be tilted by the stack S placed thereon. On the top of the substructure of the main frame 13 are provided two I-beams 35, 35, arranged in parallelism, spaced at the sides of the pivot 34 and extending parallel with the axis of the pivot, to support the tiltable chute 12 before and during the time its load or stack is being conveyed thereto.

It will be noted that the elevator is provided with rollers 36 journaled in bearings thereon, which rollers roll in contact with the inner faces of the spaced channel beams of the several guide posts as the elevator moves vertically. Thus the elevator, when in lowered position, is retained in horizontal position by means of these rollers in contact with the guide posts and the weight of the frame on the supporting posts 18, while the weight of the tiltable chute, when the latter is in horizontal position, is borne by the two cross supports or I-beams 35.

The tops of the conveyer rollers 16 and the tops of the chute-beams 31 are so related that after the stack has been deposited on the rollers above the tiltable chute, when the latter is lifted with the elevator, the weight of the sack is transferred from the rollers to the chute, as indicated by dotted lines in Figure 2. As the tiltable chute is lifted to receive the load of the stack, the chute is also lifted from its stationary supports or cross bars 35, and as the pivot or hinge joint 34 of the chute is located at one side of the longitudinal axis or center of the load on the chute, the latter, with its stack, automatically tilts over to the right in Figure 2 as the chute and stack are elevated.

As the stack tilts over to the right, its right face encounters two or more diagonally disposed braces 37 that are rigidly attached at their upper and lower ends to the main frame of the machine, and as the tiltable chute rises it continues its tilting movement as the stack travels upwardly with its right face in contact with these guide braces 37, as indicated in Figure 3. At the upper ends of the diagonal guide braces is fixed a discharge plate 38 extending parallel with the lengths of the lumber or boards in the stack, with one edge projecting over the ends of the endless conveyer chains 3, 4, and 5.

The inclination of the guide braces 37 is such that the layers of boards on the stack, if not retained, would slip or slide to the right in Figure 2. Therefore, as, the stack and tilted chute rise with the elevator, the attendant controlling the elevator through the motor 22, controls the movement of these parts in such manner that the uppermost layer of boards may slip or slide down to the right as in Figure 2, while the remaining layers of the stack are retained by the braces or guidebraces 37.

As indicated in Figure 2 the uppermost layer of boards slides out to the right over the discharge plate 38 and the successive boards are deposited on the endless chains of the chain conveyer and carried by the latter to the feed table or conveyer rolls 2.

As soon as one layer has slid from the stack to the conveyer chains, the elevator is raised another step to free a successive layer from the guide braces 37 and this freed layer then slides out and across the discharge plate to the endless chains. In this manner the operator or attendant controls the machine in such manner that the boards, singly, are delivered or deposited in quick succession on the receive ends of the conveyer chains and these chains convey the boards and deposit them on the rollers 2 of the roller-conveyer.

After one stack has been discharged to the conveyer chains the elevator is lowered, carrying with it the tilted chute and the latter is righted to level or horizontal position when it descends with the elevator and contacts with the cross bars or supports 35, 35 therefor. As soon as the chute is in proper position another stack of lumber is run onto the chute, the latter is lifted with the elevator, and successive layers of boards are discharged as described.

Having thus fully described my invention, what I claim as new and desire to secure by Letters Patent is:—

1. The combination with a vertically movable elevator and a tiltable chute thereon adapted to receive a plurality of layers of material, of means for retaining the tilted stack and means for permitting discharge of the uppermost layer of the stack.

2. The combination with a tiltable chute and means for elevating it, of guide braces for a stack or plurality of layers of material on the chute, whereby the stack may be bodily tilted and the uppermost layer successively discharged from the stack.

3. The combination with a main frame, an elevator, and operating means for the elevator, of a tiltable frame forming a chute on the elevator and adapted to support a stack of lumber in layers, and diagonally disposed guide-braces fixed to the frame for retaining the tilted stack and permitting discharge therefrom of the uppermost layer of lumber.

4. The combination with a main frame having cross bars thereon, an elevator and operating means therefor, of a tiltable chute having an off-center hinge, said chute being adapted to rest upon said cross bars when in inoperative position, and diagonally disposed guide-braces adapted to receive the weight of the stack on the chute as the latter is lifted with the elevator.

5. The combination in an unloading machine with a longitudinally extending conveyer, of an elevator and an automatically tiltable chute on said elevator adapted to receive a stack of lumber from the conveyer, means for operating the elevator and stationary guide-braces for the tilted stack whereby successive layers of lumber may be discharged from the top of the stack.

6. The combination with a conveyer adapted to move a stack of lumber in a longitudinal direction, of an elevator and an automatically tiltable chute thereon adapted to receive the stack of lumber, means for operating the elevator and stationary guide-braces for the tilted stack whereby successive top layers of lumber may be discharged from the stack, and a discharge-plate at the upper ends of said guide-braces.

7. The combination with a longitudinally extending conveyer for a stack of lumber, of an elevator and an automatically tiltable chute adapted to receive the stack from the conveyer, means for operating the elevator, stationary guide-braces for the tilted stack and a discharge plate at the upper ends of said braces whereby successive top layers of the stack are discharged over said plate, and a conveyer adapted to receive the successive elements of the successive layers as they pass over the discharge plate.

In testimony whereof I affix my signature.

F. W. HORSTKOTTE.